Dec. 28, 1943.   D. W. ASHTON   2,337,729
POULTRY BAND
Filed Nov. 15, 1940   2 Sheets-Sheet 1
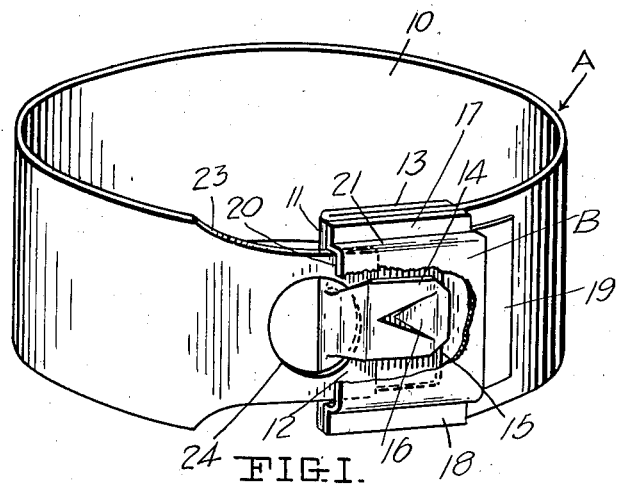
FIG. 1.
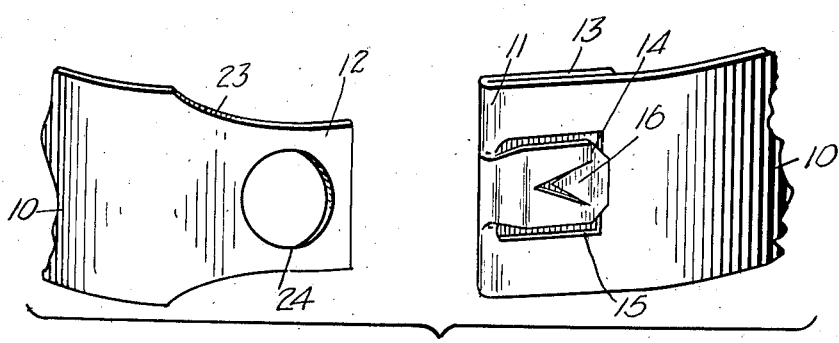
FIG. 2.
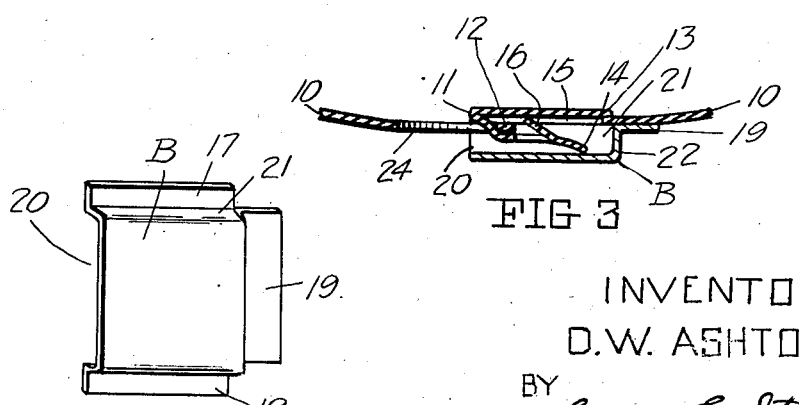
FIG. 3.
FIG. 4.
INVENTOR
D. W. ASHTON
BY
Eugene E. Stevens Dec. 28, 1943.　　　D. W. ASHTON　　　2,337,729
POULTRY BAND
Filed Nov. 15, 1940　　　2 Sheets-Sheet 2

INVENTOR
D. W. ASHTON.
BY
Eugene E. Stevens
ATTY.

Patented Dec. 28, 1943

2,337,729

UNITED STATES PATENT OFFICE 2,337,729

POULTRY BAND

Douglas Willard Ashton, Ottawa, Ontario, Canada

Application November 15, 1940, Serial No. 365,827

7 Claims. (Cl. 40—3)

This invention relates to poultry bands and the like. It has been the general practice to employ bands for the identification of poultry and other birds for a considerable period of time, the bands being clinched around the leg of the bird. It is important, of course, that the bands should be applied in such a manner that they are permanently secured and cannot be removed except by destroying the band, thus to indicate that tampering has occurred. The type of band generally employed up to the present time has been one employing a projecting eyelet in one end and an orifice in the other designed to loop over the eyelet, the latter being then clinched by specially designed clinching pliers inserted between the leg of the bird and the band to effect the clinching operation. This method, while resulting in the application of a band which cannot be removed without destroying the band and thus indicating that tampering has taken place, presents difficulties, as it necessitates the use of pliers which on the one hand, are often misplaced and cannot be found when required, while on the other, it presents a cumbersome method of applying the band which also requires more time for the operation than is really necessary.

These disadvantages are overcome by the present invention which eliminates the use of accessories such as pliers for the application of the band and provides a band which can be automatically locked on the leg of the bird in a very simple operation.

According to the invention a band is provided having a housing on one end formed with an accessible opening and encasing locking means, the other end of the band having a cooperating part insertable through the opening and into the housing, thus to automatically lock it in the housing. The invention preferably embodies a locking tang cut and projecting from one end of the band over which the housing is applied to enclose the tang, said end of the band being preferably doubled back upon and secured to the adjacent portion of the band forming a base for this end of the band which will seal any opening formed there by striking out the tang, the base, housing, and intervening portion of the band being secured together to form a unitary structure to completely enclose the tang and render the band tamperproof once the cooperating opposite end of the band has been inserted within the housing to be secured by the tang or other locking means employed.

The invention will be understood by reference to the following detailed specification taken in conjunction with the accompanying drawings.

In the drawings:

Fig. 1 is an enlarged perspective view of a form of poultry band according to the present invention, having the housing partly broken away, in order to illustrate more clearly the cooperating parts.

Fig. 2 is an enlarged fragmentary perspective of the opposite ends of the band with the housing removed from one in order to illustrate the general construction more clearly.

Fig. 3 is an enlarged longitudinal section of the ends of the band to show them in cooperatively locked position with one another.

Fig. 4 is an enlarged partial perspective view of the housing applied to one end of the band.

Figure 5:
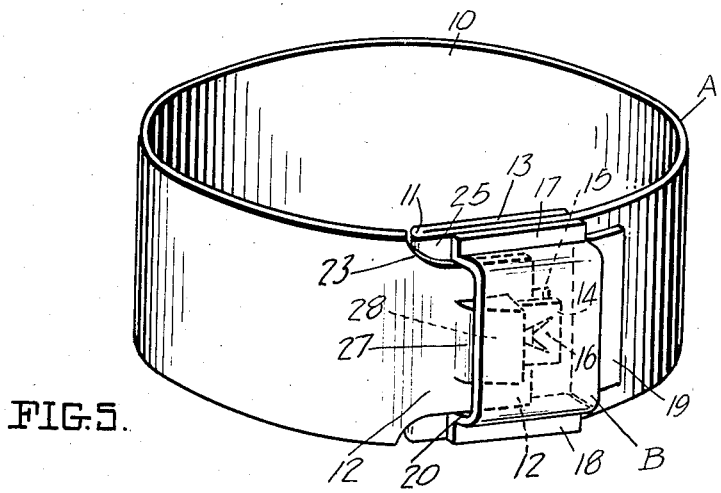
Fig. 5 is an enlarged perspective of an alternative form of construction to that shown in Fig. 1, showing the ends of the band locked together.

Referring to the drawings and first of all to Figs. 1 to 4, A indicates the band as a whole which is preferably made from a single strip of material 10 of required length, having the free ends 11 and 12, the band being designed to be curved so as to form a ring like member when the said ends of the band are locked together. The end 11 preferably has its extremity 13 doubled over upon itself and in an area overlying the doubled over extremity 13, the band is cut so as to strike therefrom a locking tang 14 designed to project from the surface of the band at an incline. The tang 14, if desired, may be reduced in width in relation to the opening 15 from which it is cut and it will be noted that the doubled over extremity 13 of the band forms a closure member for the opening from which the tongue is struck as well as forming a reinforcing base for that end of the band.

From the tongue 14 a pointed keeper 16 is preferably struck, and designed to project therefrom at an incline opposite to that incline of the tang in relation to the band. A housing B is designed to be secured on the end 11 of the band to encase the locking tang 14 and adjacent construction.

This housing is in the form of a pressed metal member having side flanges 17 and 18 projecting laterally therefrom and an end flange 19, the flanges projecting all on the same plane at the base of the housing. The housing has an accessible opening 20, side walls 21 and an end wall 22 opposite the accessible opening and when applied over the end 11 of the band the latter forms a base therefor.

The over all width of the housing from the side extremities of the flanges 17 and 18 is equal to the over all width of the band. As will be noted from the consideration of Figs. 1 and 3 the housing is preferably applied to the end 11 of the band so that the accessible opening faces in the direction of the said end and otherwise completely encases the locking tang. The housing is preferably secured by spot welding the flanges 17, 18 and 19 to the band and in the welding operation of the flanges 17 and 18 the doubled over extremity 13 is likewise welded to the band proper so that a unitary reinforced structure is therefore provided.

The opposite end of the band is tapered or reduced in width as indicated at 23 to form a tongue and is provided with an orifice or the like 24 designed to cooperate with the locking tang 14 when the tongue is inserted within the housing. The orifice 24 may take any desirable form, here shown as circular.

Upon a consideration of Fig. 3 it will be noted that the tang 14 inclining outwardly from the band end 11 finally engages or substantially engages the inner surface of the top of the housing B while the keeper 16 inclining in the opposite direction finally engages or substantially engages the base of the housing formed by the doubled over extremity 13 of said end. Therefore, when the tongue 14 of end 12 of the band is inserted within the housing it will slide along between the top of the housing and the tang 14 until its opening 24 traverses the end of the tang, at which time, the end of the tang will automatically project through the opening 24. This will prevent the normal withdrawal of the tongue from the housing and upon withdrawal movement the tang 14 will slip completely through the opening 24 until it has passed between the keeper 16 and the bottom wall of the housing so that the extremity of the end or tongue 12 will finally come to rest in the position shown in Fig. 3.

Consequently a withdrawal movement imparted to the end 12 of the band will be resisted by the tongue whereas if the end 12 is pushed towards the housing in an attempt to disengage it from the tang 14 said end will be engaged by the keeper 16 which will stop further movement in this direction. Thus, ends of the band are securely locked together and cannot be disengaged without severing the tongue or destroying the housing.

Figure 6:
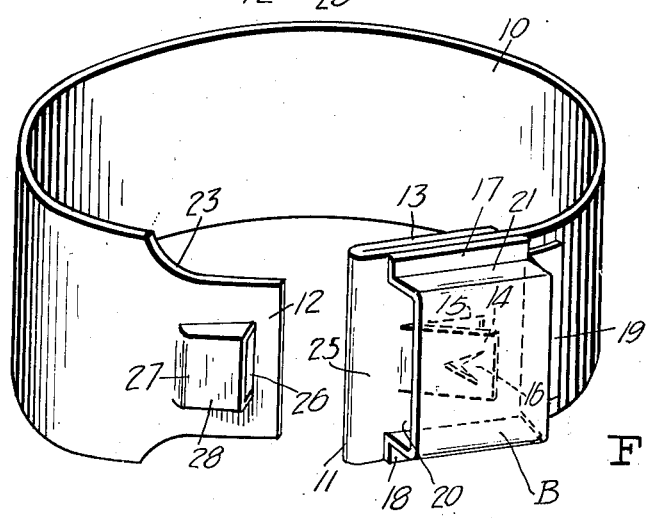
Fig. 6 is an enlarged perspective of the band shown in Fig. 5 but open in order to illustrate the formation of the end of the band insertable within the housing.
Figure 7:
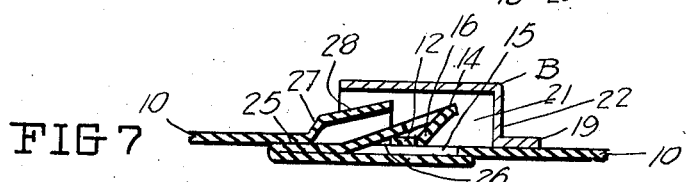
Fig. 7 is an enlarged longitudinal section taken through the ends of the bands when locked together.
Figure 8:
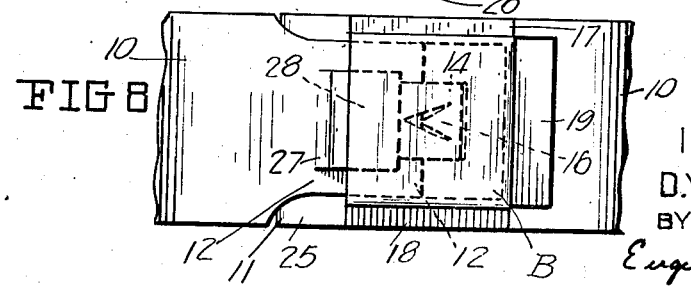
Fig. 8 is an enlarged top plan view of the ends of the band when locked together.

An alternative construction of band is illustrated in Figs. 5 to 8 which may be preferred to that described. In this form the construction of the end 11 of the band is exactly the same, and, of course, the housing is likewise similar. However, the locking tang 14 is positioned so that it is spaced inwardly from the extremity of end 11 and the housing is likewise spaced inwardly from such end so as to form, in advance of the housing, a projecting apron 25. This apron will function to form a guide for the opposite end 12 of the band in the locking operation assisting said end to strike its target (the accessible opening 20) with facility and will also form a base for the reduced end of the band 12 when it is engaged within the housing B as is clearly illustrated in Fig. 5.

The cooperating lock construction on the end 12 of the band is also formed somewhat differently. Instead of an orifice such as 24 or of any other convenient shape an opening 26 is provided above the plane of the surface of the end 12 and substantially at right angles thereto. This is made possible by die punching the end 12 to form the projecting housing 27 which is downwardly and rearwardly sloped as at 28, so that its greatest depth is at the forward end where it is cut so as to provide the enlarged opening 26. The disposition of the opening 26 increases the facility with which said opening will permit the tang 14 to pass therethrough in the locking operation of the band as it forms a guideway for the tang and while the tongue is securely locked with the tang in exactly the same manner as described in the construction illustrated in Figs. 1 to 4 a further advantage accrues from this alternative form in that the projecting housing 27 in effect forms a closure for the accessible opening 20 of the housing B and completely encases the tongue 14 from the outside, thus it is difficult even to attempt to sever the tongue and, for instance, to sever it in such a way that the band might be again temporarily caught to give the impression that the band had not been tampered with if such a condition could arise.

From the foregoing it will be appreciated that I have provided a self locking tamperproof band for poultry and the like which can be applied with facility and which eliminates the necessity of employing instruments for its application. It will also be appreciated that the cooperating locking parts will readily cooperate with one another and will be completely housed to prevent tampering when the band is locked. However, while the cooperating locking parts illustrated represent the preferred form of construction it will be obvious that other cooperating locking parts might be employed without departing from the broad spirit of the invention.

What I claim as my invention is:

1. A poultry band or the like comprising a single strip of material designed to be curved to form a ring like member having opposed ends designed to engage and lock with one another to form a complete ring, one end having a projecting tang struck therefrom and the other having a tongue orificed to engage the tang, retaining means in connection with the tang for preventing disengagement of the tongue, a casing applied over and secured to one side of the strip at that end having the tang, to enclose the latter, the casing being disposed on one side of the strip only and having an opening to permit entry of the tongue and a base plate lying upon in abutting relation and secured to the surface of the opposite side of the strip to that carrying the housing and in an area underlying the housing, said base plate sealing an opening in the strip formed by striking the tang therefrom and preventing access to the housing except through its normal access opening.

2. A band as claimed in claim 1, in which the base plate is part of the strip doubled upon itself and secured to that portion of the strip which it abuts.

3. A band as claimed in claim 1, in which the base plate is part of the strip doubled upon itself, said base plate and the housing being secured by welding to the intervening portion of the strip to form therewith a substantially integral construction.

4. A band as claimed in claim 1 in which the housing is formed with flanges projecting substantially at right angles to its walls and designed to lie along the surface of the strip, said flanges and the marginal edges of the base plate lying below the flanges being secured in common to the intervening portion of the strip.

5. A poultry band or the like comprising a single strip of material formed at one end with locking means struck from the strip and at the opposite end provided with a tongue designed to cooperate with the locking means to lock said ends together automatically when engaged, the end carrying the locking means having its extremity doubled back to lie over the area carrying the locking means and on the opposite side of the strip to provide a closure for an opening in the strip from which the locking means is struck, and a housing applied to said latter end of the strip disposed on one side of the strip only and opposite to the doubled back extremity to enclose the locking means, said housing being formed to provide an accessible opening permitting entry of the tongue to the housing and being flanged about its periphery, said flanges of the housing, the marginal edges of the doubled extremity of said end of the strip and the intervening portion of the strip which they abut being commonly welded to form a unitary structure.

6. In a poultry band or the like a strip of material having the extremity of one end doubled back and disposed to abut a corresponding area of the strip, a housing disposed on the opposite side only of the strip and in an area overlying the doubled extremity, said doubled extremity, said housing and the intervening portion of the strip being commonly secured to form a unitary reinforced end for the strip, the housing having an accessible opening adjacent to the doubled end of said strip and facing the opposite end of the strip when the band is curved to form a ring-like member, to receive the opposite end of the strip, said housing having side walls, and an end wall opposite to the accessible opening enclosing the cooperating ends of the strip when engaged to render the lock band tamper-proof and locking means within the housing to secure the opposite end of the strip when projected through the opening, the latter end being provided with means to cooperate with the locking means in the housing to lock said cooperating parts together therewithin.

7. A band as claimed in claim 1 in which the orifice in the tongue is formed by depressing a portion of it to form a guideway, the said orifice being formed at one end of the guideway and disposed in a plane at an angle to the plane of the tongue, the depressed portion of the tongue forming a shield for the locking means at the opening of the casing when the tongue and tang are engaged therewithin.

DOUGLAS WILLARD ASHTON.